Patented Feb. 5, 1935

1,990,457

UNITED STATES PATENT OFFICE 1,990,457

ROSIN SIZE AND METHOD OF MANUFAC-
TURING THE SAME

George James Manson, Hawkesbury, Ontario,
Canada, assignor to Manson Chemical Company, a corporation of New Jersey No Drawing. Application May 10, 1924,
Serial No. 712,478

2 Claims. (Cl. 134—21)

This invention relates to improvements in rosin sizes and the method of manufacturing the same, and the objects of the invention are to enable the rosin size used for various purposes to be manufactured without the use of heat; and it consists essentially in the emulsifying of the rosin with clay, water and alkali, and grinding the same cold as hereinafter more fully set forth and described.

In practically carrying out the process, I take the following proportions or thereabouts:

| | Parts |
|---|---|
| Rosin | 85 |
| Colloidal clay | 15 |
| Water | 100 |
| Alkali, such as caustic soda | 2 |

The rosin, clay and alkali with the water are then ground cold in a suitable ball mill until, say ninety-five per cent. of the particles will pass a .200-in. mesh screen. The original rosin, clay and soda before emulsifying is of such size that it will pass through a ¼-in. screen mesh. Alternatively the alkali may be added after emulsification.

The emulsion when made will be found to be non-adhesive, and may be readily conveyed and applied in the manner well known in the art.

As many changes could be made in the above construction and many widely different embodiments of my invention within the scope of the claims, constructed without departing from the spirit or scope thereof, it is intended that all matter contained in the accompanying specification shall be interpreted as illustrative and not in a limiting sense.

What I claim as my invention is:

1. The herein described method which comprises dispersing rosin in the cold by grinding with colloidal clay in a slightly alkaline solution.

2. The method of making rosin size which comprises dispersing rosin in the presence of clay in a slightly alkaline aqueous medium the proportions of rosin to alkaline material yielding a small amount of resinate acting as an emulsifying agent, most of the rosin in the emulsion being free, whereby a non-adhesive rosin size is obtained.

GEORGE JAMES MANSON.